A. H. NELSON.
ROTARY PUMP.
APPLICATION FILED APR. 9, 1915. RENEWED DEC. 2, 1919.

1,387,296. Patented Aug. 9, 1921.

Witnesses.
J. Morrill Fuller
William C. Gagen

Inventor.
Albert H. Nelson,
by Heard Smith & Tennant.
Atty's.

UNITED STATES PATENT OFFICE.

ALBERT H. NELSON, OF BOSTON, MASSACHUSETTS, ASSIGNOR TO BABCOCK-DAVIS CORPORATION, OF BOSTON, MASSACHUSETTS, A CORPORATION OF MASSACHUSETTS.

ROTARY PUMP.

1,387,296.  Specification of Letters Patent.  Patented Aug. 9, 1921.

Application filed April 9, 1915, Serial No. 20,307. Renewed December 2, 1919. Serial No. 342,016.

*To all whom it may concern:*

Be it known that I, ALBERT H. NELSON, a citizen of the United States, residing at Boston, county of Suffolk, State of Massachusetts, have invented an Improvement in Rotary Pumps, of which the following description, in connection with the accompanying drawing, is a specification, like characters on the drawing representing like parts.

This invention relates to blowers of the rotary type embodying a cylindrical rotor-receiving chamber in which a rotor having blades is mounted eccentrically, and which has inlet and outlet openings so that as the rotor rotates air will be drawn in through the inlet opening and compressed and then discharged through the outlet opening. The invention has for its object to provide a simple blower which can be operated at a comparatively high speed without danger of heating, which will deliver a large volume of air with a comparatively small expenditure of power, and which is provided with novel means for regulating the air pressure delivered therefrom so as to provide for delivery of air under any desired pressure.

I accomplish these objects by a novel anti-friction bearing for the rotor and by making the device with a pressure-equalizing chamber into which the air is delivered from the rotor-receiving chamber, and which is provided with means by which the pressure can be controlled without varying the speed of operation of the blower.

In order to give an understanding of my invention I have illustrated in the drawings a selected embodiment thereof which will now be described, after which the novel features will be pointed out in the appended claims.

Figure 1:
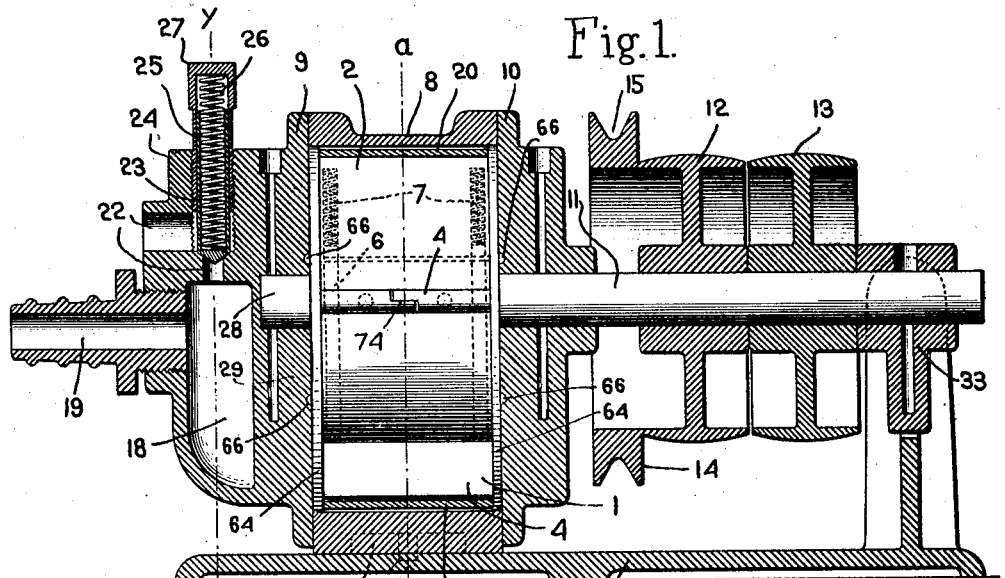
Figure 1 is a vertical sectional view through a blower embodying my invention taken on the line $x$—$x$, Fig. 2.
Figures 2, 3, 5:
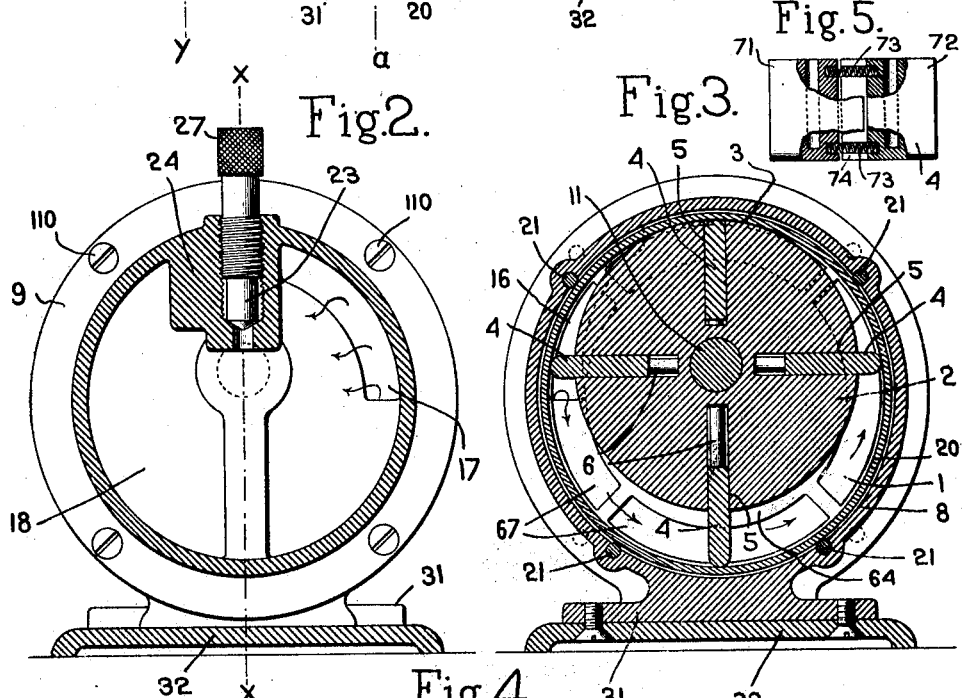
Fig. 2 is a section taken on the line $y$—$y$, Fig. 1.
Fig. 3 is a section taken on the line $a$—$a$, Fig. 1.
Fig. 5 is a detail view of one of the blades.
Figure 4:
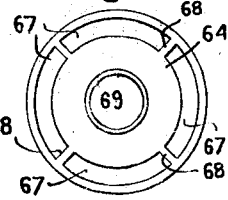
Fig. 4 is a view of one of the side-bearing plates.

The rotor-receiving chamber is shown at 1 and the rotor therein is shown at 2. This rotor is eccentrically mounted in the chamber 1 so as to engage the periphery thereof at the upper side, as at 3, and said rotor is provided with a plurality of radially-arranged blades 4 that have bearing against the interior wall of the chamber 1 and divide said chamber into separate compartments. The blades 4 are radially movable and are yieldingly held against the walls of the rotor-receiving chamber. The blades are herein shown as operating in grooves 5 formed in the rotor 2 and as guided on pins 6 carried by the rotor and which enter apertures in the inner edges of the blades. Each blade has situated within it springs 7 engaging the ends of the pins 6, which springs tend to force the blades outwardly into contact with the wall of the rotor-receiving chamber. Said rotor-receiving chamber is herein formed by an annular body portion 8 within which the rotor is received and two heads or end members 9 and 10 that are secured to the body portion 8 by suitable bolts or screw 110 and which form the ends of the chamber 1. The rotor is mounted on a shaft 11 which is journaled in the heads 9 and 10, respectively, and said shaft carries any suitable means by which it may be rotated, such, for instance, as the fast and loose pulleys 12 and 13. The pulley 12 is shown as having a flange 14 associated therewith provided with a V-groove 15 for receiving a round belt, thus adapting the device to be driven by either a flat or a round belt. The shaft 11 can, however, be rotated by any suitable means without departing from the invention. The head 10 is provided with an inlet port 16 leading into the rotor-receiving chamber and the head 9 is provided with the outlet port 17. This outlet port leads into a pressure-equalizing chamber 18 that is formed in the head 9, and said chamber has a discharge nipple 19 connected thereto to which a delivery pipe can be secured. As the rotor operates air is drawn in through the inlet port 16 and is carried around between the blades 4 and is compressed as the rotor operates and is then delivered to the chamber 18 from which it is discharged through the nipple 19.

To reduce the friction between the blades 4 and the walls of the chamber 1, I employ a sleeve 20 which encircles the rotor and blades and which is freely rotatable in the body 8 of the device. The ends of the blades bear against and make a tight joint with the inner face of the sleeve, and as the latter can rotate freely, it will turn as the rotor is revolving, thus eliminating the friction of the blades against the walls of the chamber 1.

If desired, I may provide anti-friction bearings for the shell or sleeve 20 in the housing 8 to further reduce friction, and in the illustrated embodiment of my invention I have shown such bearings in the form of anti-friction rolls 21 that are carried by the body 8 and on which the shell 20 rests. Such anti-friction bearings are not necessary, however, as the shell 20 can be made to rotate freely in the housing 8 without excessive friction.

With this construction the shell 20 constituting the exterior wall of the rotor-receiving chamber will rotate with the rotor 2, and as a result there will be very little relative movement between the blades 4 and the interior wall of the shell 20, such movement being only that occasioned by the eccentricity of the rotor. By this means the friction between the blades 4 and the interior wall of the rotor-receiving chamber is eliminated, thus obviating any danger of the heating of the parts, and also reducing materially the power necessary to drive the rotor, for it will be obvious that the device can be constructed so that the friction between the exterior surface of the shell 20 and the housing 8 will be very much less than that which would be developed between the blades and a stationary wall of the chamber 1.

In order to still further reduce any friction between the rotor and the stationary parts of the casing, I propose to employ anti-friction side plates 64 which are interposed between each end of the rotor and the end wall of the rotor-receiving chamber 1. These plates 64 are concentrically situated in the chamber 61, and the rotor with the blades, as well as the sleeve 20, is received between said plates, the latter having smooth inner faces that engage the end walls of the rotor. Each plate is also provided with a central aperture 69 through which the shaft 11 extends, said apertures being large enough to accommodate the eccentricity of the shaft 11. Ball bearings 66 are placed between the walls of the chamber and the plates 64 in order to reduce friction. Since these end plates or disks 64 fit tightly against the ends of the rotor 2 and also against the ends of the sleeve 20, there will be no chance for leakage of air from the spaces between the blades 4. When the rotor is rotating the friction thereof with the plates 64 will cause them to rotate thus eliminating practically all the friction between the ends of the rotor and the heads 9 and 10 of the casing. These plates 64 are provided with ports or openings 67 situated in line with the ports 16 and 17, said ports 67 being separated by narrow bars or arms 68. These ports 67, therefore, extend entirely around the plates and hence the ports 16 and 17 will not be cut off or closed in any position of the plates 64.

When the rotor is in operation both the plates 64 as well as the sleeve 20 will rotate with the rotor, and as said plates and sleeve both have anti-friction bearings the friction will be reduced to a minimum. It will thus be seen that the rotor is inclosed within a chamber the end and peripheral walls of which rotate with the rotor and the friction of the rotor is, therefore, reduced to practically nothing.

In order to insure a tight joint between the blades 4 and the side plates 64, I may make each blade in two sections 71, 72 and provide a spring or springs 73 between said sections which hold the side edges of the blades in contact with the plates 64 and thus compensate for any wear. The two sections of each blade have a tongue-and-groove connection, as shown at 74, so that the end of each blade which engages the inner wall of the shell 20 will present a continuous surface.

As stated above, the air is discharged from the chamber 1 through the port 17, into a pressure-regulating chamber 18 formed in the head 9.

In order to regulate the pressure in the chamber 18 and thereby the pressure of the air delivered therefrom without varying the speed of rotation of the rotor, I have provided herein a by-pass port 22 leading from the chamber 18 to the atmosphere, and which is herein shown as formed in the thickened portion 24 of the wall of said chamber, said port being controlled by a pressure-controlling valve 23. The valve 23 is a spring-pressed valve and is herein shown as provided with a hollow stem 25 within which is situated a spring 26 that normally keeps the valve closed, the tension of said spring being controlled by a cap screw 27 that encircles the valve stem 25 and is screw-threaded into the portion 24. By simply turning the regulating screw 27 one way or the other the tension of the spring 26 will be correspondingly varied and thus any desired pressure can be maintained in the chamber 18. In the construction herein shown the spring 26 is comparatively long, this being permitted by the shape of the valve and of the adjusting screw 27. The advantage of this is that the compression of the spring due to lifting the valve does not affect its tension materially as would be the case if the spring were a shorter spring. With this invention if a pressure of say four pounds is desired the adjusting screw 27 will be adjusted accordingly, and such pressure will then be automatically maintained so long as the rotor is operating, for if a greater pressure is developed the valve 23 will be lifted allowing some of the air to escape through the by-pass port, and thus the pressure will be reduced to the desired amount.

It will be noted that the end 28 of the shaft 11 does not extend entirely through the wall 29 separating the rotor-receiving chamber from the pressure-regulating chamber, and, therefore, there is no chance of air leaking out from the rotor-receiving chamber around the bearing for the shaft.

In the illustrated embodiment of my invention the body portion 8 is formed with a foot portion 31 which is secured to a base plate 32, and the latter has rising therefrom the bearing 33 for one end of the shaft 11. The device thus constructed constitutes a self-contained device which is readily transportable and which can be operated from either a flat or a round driving belt.

By making the device with the pressure-equalizing chamber 18 at one end of the rotor-receiving chamber and by placing the inlet port 16 at the other end of said chamber 4, a very compact structure is provided. It will be noted that all the air is taken in through the port 16 and head 10 and then is transferred through the port 17 in the head 9 to the chamber 18, from which it is delivered through the delivery nozzle 19. By this arrangement it is possible to have the chamber 18 practically co-extensive in area and size with the head 9, and a sufficiently large chamber to act properly as a pressure-equalizing chamber can be provided without appreciably increasing the size of the device.

While I have herein illustrated a selected embodiment of my invention, I do not wish to be limited to the constructional features shown.

I claim:

1. In a blower, the combination with a rotor-receiving chamber having inlet and outlet ports, of a rotor therein having radially-extending blades, and means to rotate the rotor, the peripheral and end walls of said rotor-receiving chamber being freely rotatable.

2. In a rotary blower, the combination with a casing, of a cylindrical shell freely rotatable within the casing, a rotor situated within said shell eccentrically thereof and having radially-extending blades which engage the inner surface of the shell, and freely-rotatable plates between the ends of the rotor and end walls of said chamber.

3. In a rotary blower, the combination with a casing provided with a rotor-receiving chamber, and a pressure-equalizing chamber axially arranged, of a rotor eccentrically mounted in the rotor-receiving chamber and provided with radially-extending blades, said casing having in one end an inlet port and in the opposite end a discharge port leading to the pressure-equalizing chamber, a freely-rotatable plate interposed between each end of the rotor and the corresponding end of the rotor-receiving chamber, said plates having openings or ports therein in line with the inlet and outlet ports.

4. In a rotary blower, the combination with a casing divided by a transverse partition to present two axially-arranged chambers, one constituting a rotor-receiving chamber and the other a pressure-regulating chamber, one end of the casing having an inlet port therein leading into the rotor-receiving chamber and said partition having a discharge port therethrough leading from the rotor-receiving chamber to the pressure-regulating chamber and the other end of the casing having an outlet port leading from the pressure-regulating chamber, of a rotor eccentrically mounted in said rotor-receiving chamber and provided with radially-extending blades, the peripheral wall of the pressure-regulating chamber being considerably thickened at one point and said thickened portion having an L-shaped by-pass port therein which leads from the pressure-regulating chamber to the atmosphere at the end of the casing and is provided at the bend thereof with a valve seat, and a spring-pressed pressure-regulating valve engaging said seat and by which the pressure in the pressure-regulating chamber is controlled.

In testimony whereof, I have signed my name to this specification, in the presence of two subscribing witnesses.

ALBERT H. NELSON.

Witnesses:
 BERTHA F. HEUSER,
 THOMAS J. DRUMMOND.